US009898869B2

(12) United States Patent

Shapira et al.

(10) Patent No.: US 9,898,869 B2

(45) Date of Patent: Feb. 20, 2018

(54) TACTILE INTERACTION IN VIRTUAL ENVIRONMENTS

(71) Applicant: Microsoft Technology Licensing, LLC, Redmond, WA (US)

(72) Inventors: Lior Shapira, Redmond, WA (US); Xavier Benavides Palos, Cambridge, MA (US); Judith Amores Fernandez, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/932,282

(22) Filed: Nov. 4, 2015

(65) Prior Publication Data

US 2017/0069134 A1 Mar. 9, 2017

Related U.S. Application Data

(60) Provisional application No. 62/216,248, filed on Sep. 9, 2015.

(51) Int. Cl.

| | |
|---|---|
| ***G09G 5/00*** | (2006.01) |
| ***G06T 19/00*** | (2011.01) |
| ***G06F 3/01*** | (2006.01) |

(52) U.S. Cl.

CPC ............ *G06T 19/006* (2013.01); *G06F 3/011* (2013.01)

(58) Field of Classification Search

CPC ............................... G06T 19/006; G06F 3/011

USPC ............................................................ 345/633

See application file for complete search history.

(56) References Cited

U.S. PATENT DOCUMENTS

| | | | |
|---|---|---|---|
| 5,422,715 | A | 6/1995 | Clarke |
| 5,423,554 | A | 6/1995 | Davis |
| 7,372,977 | B2 | 5/2008 | Fujimura et al. |
| 7,907,128 | B2 | 3/2011 | Bathiche et al. |
| 8,248,367 | B1 | 8/2012 | Barney et al. |
| 8,600,550 | B2 | 12/2013 | Kurzweil |
| 8,660,303 | B2 | 2/2014 | Izadi et al. |

(Continued)

OTHER PUBLICATIONS

The Written Opinion of the International Preliminary Examining Authority for PCT application No. PCT/US2016/050325, dated Mar. 8, 2017, 7 pages.

(Continued)

*Primary Examiner* — Ryan R Yang

(74) *Attorney, Agent, or Firm* — Schwegman Lundberg & Woessner, P.A.

(57) ABSTRACT

Tactile virtual reality (VR) and/or mixed reality (MR) experiences are described. Techniques described herein include receiving data from a sensor and accessing a position and an orientation of a real object that is physically present in a real scene. Furthermore, techniques described herein include identifying the real object based at least in part on the position and the orientation of the real object and causing a graphical element corresponding to the real object to be rendered on a display of a VR and/or MR display device. The graphical element can be determined based at least in part on a VR and/or MR application. The techniques described herein include determining an interaction with the real object and causing a functionality associated with the graphical element to be performed in the VR or MR environment rendered via the VR and/or MR display device, respectively.

18 Claims, 8 Drawing Sheets

(56) References Cited

U.S. PATENT DOCUMENTS

| | | | | |
|---|---|---|---|---|
| 8,890,813 | B2 | 11/2014 | Minnen | |
| 2012/0262558 | A1 | 10/2012 | Boger et al. | |
| 2014/0104274 | A1 | 4/2014 | Hilliges et al. | |
| 2014/0125698 | A1 | 5/2014 | Latta et al. | |
| 2014/0250397 | A1* | 9/2014 | Kannan | G06F 3/0484 715/771 |
| 2015/0301592 | A1* | 10/2015 | Miller | G06F 3/011 345/156 |

OTHER PUBLICATIONS

Bouzit, et al., "The Rutgers Master II-ND force feedback glove", 2002, . In Haptic Interfaces for Virtual Environment and Teleoperator Systems, HAPTICS 2002. Proceedings. 10th Symposium on. 145-152. DOI: http://dx.doi.org/10.1109/HAPTIC.2002.998952, 2 pages.
Charbonnier, et al., "Real Virtuality. Technical Report. Artanim Foundation", 2015. http://www.artanim.ch/pdf/Real%20VirtualityWhite%20Paper. 8 pages.
Gallace, et al., "In touch with the future: The sense of touch from cognitive neuroscience to virtual reality", 2014, OUP Oxford. https://books.google.com/booksidqAnEAgAAQBAJ, 1 page.
Hamza-Lup, et al., "The haptic paradigm in education: Challenges and case studies", 2010 The Internet and Higher Education 13, 12 78-81. DOI: ttp://dx.doi.org/10.1016/j.iheduc.2009.12.004 Special Issue on the Community of Inquiry Framework: Ten Years Later. 2 pages.
Hasegawa, et al., "Human Scale Haptic Interaction with a Reactive Virtual Human in a real time physics Simulator", Tokyo Institute Technology, Jul. 2006, 12 pages.
"Is VR True to Scale? Eperiments Say Yes", Jun. 3, 2015, 10 pages.
Jones, et al. "RoomAlive Magical Experiences Enabled by Scalable, Adaptive Projector-camera Units", 2014, In Proceedings of the 27th Annual ACM Symposium on User Interface Software and Technology (UIST '14). ACM, New York, NY, USA, 637-644, DOI, http;//dx.doi.org/10.1145/2642918.2647383.
Kim, et al., "Tactile Rendering of 3D Features on Touch Surfaces", 2013, In Proceedings of the 26th Annual ACM Symposium on User Interface Software and Technology (UIST '13) ACM. http://doi.acm.org/10.1145/2501988.2502020.
Kirsh, "Embodied Cognition and the Magical Future of Interaction Design", 2013, ACM Trans. Comput.-Hum. Interact. 20, 1, Article 3, 2 pages, http://dx.doi.org/10.1145/2442106.2442109.
La'davas, "Functional and dynamic properties of visual peripersonal space", Jan. 2002, Trends in cognitive sciences 6, http://dx.doi.org/10.1016/s1364-6613(00)01814-3, 2 pages.
Leibe, et al., "The Perceptive Workbench Towards Spontaneous amd Natural Interaction in Semi-Immersive Virtual Environments", GVU Center, Georgia Institute of Technology, retrieved Oct. 19, 2015, 9 pages.
Meyer, et al., "Dynamics of ultrasonic and electrostatic friction modulation for rendering texture on haptic surfaces", In Haptics Symposium Haptics, 2014, IEEE, 5 pages.
Minogue, et al., "Haptics in education Exploring an untapped sensory modality", 2006, Review of Educational Research 76, 3. 33 pages.
"OculusVR", 2015, Oculus Rift DK2, <<http://www.oculus.com/en-us/dk2>>, 4 pages.
"OptiTrack", OptiTrack Prime 13 Motion Capture, 2015, <<http://www.optitrack.com/products/flex-13>>, 3 pages.
Sodhi, et al., "AIREAL Interactive Tactile Experiences in Free Air", 2013, ACM Trans. Graph, 32, 4, Artcile 134, Jul. 2013, <<http://dx.doi.org/10.1145/2461912.2462007>>, 10 pages.
Trouche, et al., "Real Virtuality Perspectives Offered by the Combination", Apr. 15, 2015, 8 pages.
"Unity3D", 2015, Unity, <<http://www.unity3d.com>>, 3 pages.
Zacharias, et al., "Is physicality an important aspect of learning through science experimentation among kindergarten students?", Early Childhood Research Quarterly 27, 2012, <<http://dx.doi.org/10.1016/j.ecresq.2012.02.004>>, 3 pages.
"International Search Report and Written Opinion for PCT/US2015/050325", dated Nov. 9, 2016, 12 pages.
"International Preliminary Report on Patentability Issued in PCT Application No. PCT/US2016/050325", dated Jun. 28, 2017, 8 Pages.

* cited by examiner

TACTILE INTERACTION IN VIRTUAL ENVIRONMENTS

RELATED APPLICATION

This application claims the benefit of U.S. Provisional Application No. 62/216,248 filed on Sep. 9, 2015, the entire contents of which are incorporated herein by reference.

BACKGROUND

Computing systems can help generate new environments including virtual reality (VR) environments and/or mixed reality (MR) environments. Virtual reality (VR) is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. Mixed reality (MR) is a hybrid reality experience, which merges real worlds and virtual worlds. MR is a technology that produces MR environments where a physical, real-world person and/or objects in physical, real-world scenes co-exist with virtual, computer-generated people and/or objects in real time. For example, a MR environment can augment a physical, real-world scene and/or a physical, real-world person with computer-generated graphics (e.g., a dog, a castle, etc.) in the physical, real-world scene viewed via a MR display device.

SUMMARY

Tactile virtual reality (VR) and/or mixed reality (MR) experiences are described. Techniques described herein include receiving data from a sensor and accessing a position and an orientation of a real object that is physically present in a real scene. Furthermore, techniques described herein include identifying the real object based at least in part on the position and the orientation of the real object and causing a graphical element corresponding to the real object to be rendered on a display of a VR and/or MR display device. The graphical element can be determined based at least in part on a VR and/or MR application. The techniques described herein include determining an interaction with the real object and causing a functionality associated with the graphical element to be performed in the VR or MR environment rendered via the VR and/or MR display device, respectively.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
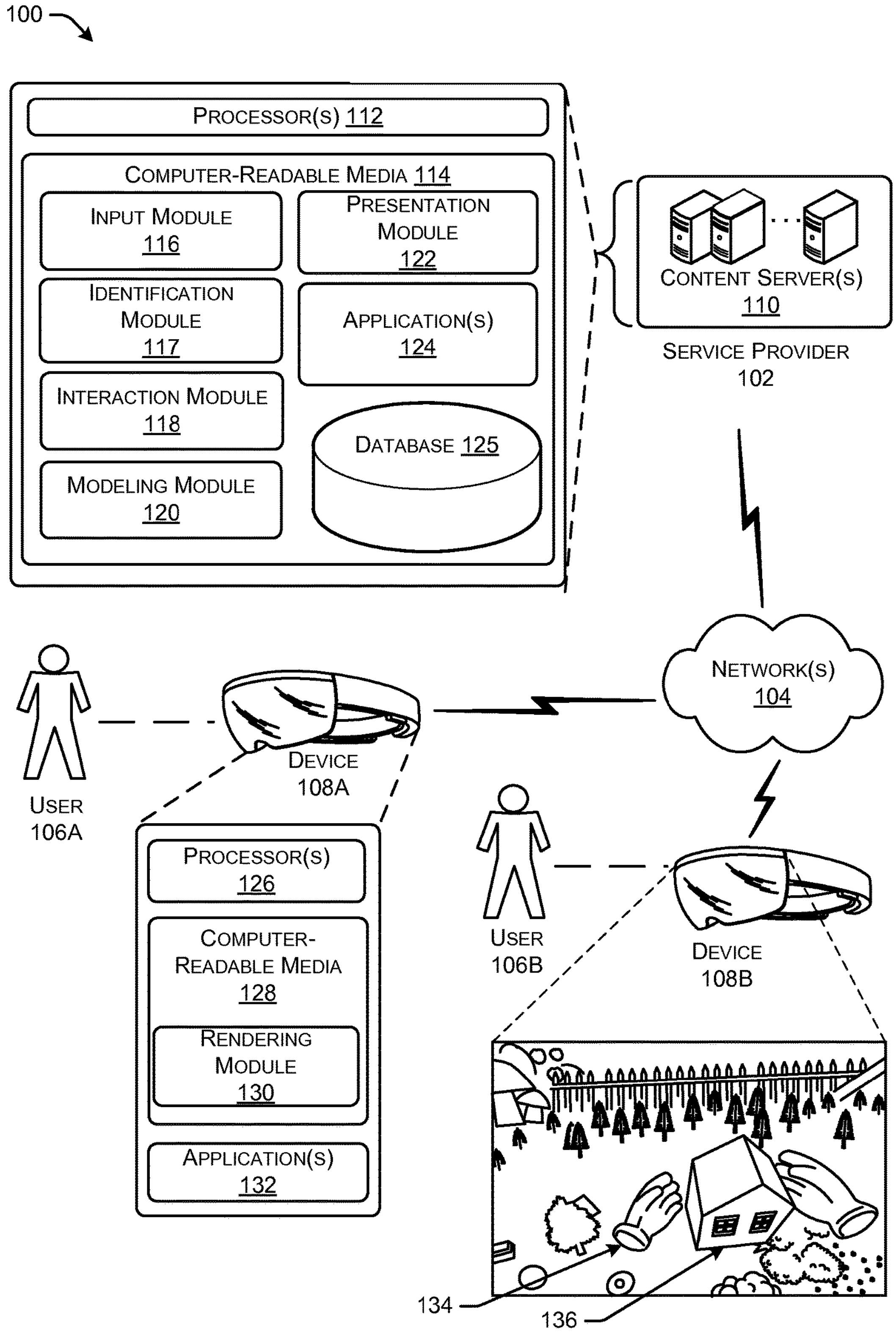
FIG. 1 is a schematic diagram showing an example environment for providing users with a tactile VR experience and/or MR experience.

Techniques described herein are directed to providing users with tactile virtual reality (VR) and/or mixed reality (MR) experiences. In an example, a tactile VR experience is one in which a user is able to move via his own body in a VR environment, can see himself and/or portions of himself in the VR environment, and can interact with the VR environment by touching and playing with simple, familiar, everyday real objects in the real world that correspond to virtual objects in the VR environment. Alternatively, a tactile MR experience is one in which a user is able to move via his own body in a MR environment, can see himself and/or portions of himself in the MR environment, and can interact with the MR environment by touching and playing with simple, familiar, everyday real objects in the real world that can be augmented by virtual objects in the MR environment.

For the purposes of this discussion, physical, real-world objects ("real objects") or physical, real-world people ("real people" and/or "real person") describe objects or people, respectively, that physically exist in a physical, real-world scene ("real scene"). Real objects and/or real people can move in and out of a field of view based on movement patterns of the real objects and/or movement of a user and/or user device. Virtual, computer-generated content ("virtual content") can describe content that is generated by one or more computing devices to generate a virtual, computer-generated environment ("virtual environment," "VR environment," or "MR environment"). In at least one example, virtual content can include one or more pixels each having a respective color or brightness that are collectively presented on a display such as to represent a person, object, etc. in the virtual environment. Virtual content can be rendered on a display of a VR device or MR device via techniques described herein. In additional and/or alternative examples, virtual content can include computer-generated content such as sound, video, global positioning system (GPS) content, etc.

In some examples, virtual objects can correspond to real objects, as described herein. That is, in some examples, individual virtual objects can map to individual real objects and can move, track, and/or respond to interactions consistent with the individual real objects. In such examples, a virtual object can include a virtual element that represents the geometry and/or surface details of a real object. The virtual element itself may not include graphical content. Additionally and/or alternatively, the virtual object can include a graphical element that can be rendered on top of the virtual element. The graphical element can include one or more pixels each having a respective color or brightness that are collectively presented on a display such as to represent an object, etc. that maps to and moves/tracks with the real object. The graphical element can depend on VR and/or MR applications. That is, the graphical element can change based on different VR and/or MR applications while the virtual element persists.

In at least one example, the techniques described herein include receiving data from a sensor. As described in more detail below, the data can include tracking data associated with the positions and orientations of the users and real objects in a real scene in which at least one of the users is physically present. Based at least in part on receiving the data, the techniques described herein can include determining that a user that is physically present in the real scene interacts with a real object that is physically present in the real scene via an interaction. In some examples, the real object can be associated with a unique identifier. The techniques further include accessing a virtual element corresponding to the real object. In some examples, the virtual element can be associated with the unique identifier. The virtual element can map to the real object such that the virtual element has a same three-dimensional geometry as the real object and the virtual element represents the geometry and/or surface details of the real object. In some examples, one or more graphical elements can also be associated with the unique identifier. In at least one example, a virtual object corresponding to a real object can include the virtual element and a graphical element of the one or more graphical elements. The graphical element can change depending on virtual environments associated with VR applications. The techniques can include rendering the graphical element in a virtual environment of the virtual environments via a display of a VR device. The techniques described herein include determining an interaction with the real object and causing a functionality associated with the graphical element and the interaction to be performed in the VR environment rendered via the VR display device. In an example where more than one user is interacting in the virtual environment, the virtual objects can be presented to individual users based on a viewing perspective of the respective users (e.g., a location of a VR device within the real scene).

For illustrative purposes, the Detailed Description describes various examples of tactile interaction in a VR environment. However, as described above, the techniques described herein can also be applicable to MR environments. In MR environments, virtual objects that correspond to real objects can be rendered on an MR display in a real scene instead of a virtual scene. Accordingly, the techniques described herein can be applicable to both VR environments and MR environments for providing tactile VR experiences or tactile MR experiences, respectively.

The techniques described herein can be useful for enabling users to interact with real objects that correspond to virtual objects in a VR environment. As described above, virtual objects, specifically graphical elements of virtual objects, can change based at least in part on different VR applications. As described above, a virtual element can represent the geometry and/or surface details of a real object. A graphical element can be rendered on top of the virtual element and can change based at least in part on the different VR applications. Each of the VR applications can offer a different VR environment/scene/experience/etc. That is, a single real object can be utilized with various VR applications and can be associated with different virtual content in each VR application.

In at least one example, a virtual environment can be a virtual toy room, whose dimensions match a real room where the user is situated. The virtual toy room can be associated with a toy room VR application. One or more real blocks can be set around the real room. In the virtual toy room, there can be one or more virtual blocks in same positions as the one or more real blocks in the real room. The virtual blocks can represent proxies of real blocks. That is, the virtual blocks can represent virtual objects that correspond to the real blocks. In at least one example, individual ones of the real blocks can serve as gateways to the other virtual experiences. For instance, each gateway block can appear as a glowing transparent block within which exists a miniature world. The miniature world can represent the virtual experience to which each corresponding block leads. This example can allow children (and adults) to move freely about the real environment and interact with real objects that correspond to virtual objects in the virtual environment.

In at least one example, a user can enter a virtual village by interacting with one of the gateway blocks described above. The user can view the virtual village from a perspective of a giant overlooking a virtual village. Virtual houses in the virtual village can be proxies of real blocks. That is, the virtual houses can represent virtual objects that correspond to individual real blocks. Users can interact with the individual real blocks and cause changes to an appearance of the virtual content corresponding to the individual real blocks. That is, based at least in part on the interactions, the graphical element associated with the virtual object corresponding to the individual real blocks can change. For instance, if a user shakes a real block, the virtual house can change from a farm house to a town house. In some examples, as the real blocks are placed on the real ground, virtual life can spring around the virtual houses corresponding to the real blocks. The virtual life can be in the form of trees, street signs, and small people who live in them.

In some examples, some of the real blocks can correspond to virtual tools with which users can interact. That is, the virtual tools can represent virtual objects that correspond to individual real blocks. For instance, some virtual tools can affect the weather in the VR environment. In at least one example a user can shake a real block to cause virtual snow and/or virtual rain to fall from the corresponding virtual tool. That is, based on a shaking interaction with the real block, the virtual object corresponding to the real block can perform an associated functionality in the VR environment. In another example, a virtual tool can be a virtual explosive device that, upon determining that the user throws the real block, can blow up a virtual forest. That is, based on a throwing interaction with the real block, the virtual object corresponding to the real block can perform an associated functionality in the VR environment. Yet another virtual tool can represent a virtual pair of binoculars, which, based on determining that the user moves the real block up to the user's eyes, can enable the user to see a virtual universe. That is, based on an interaction with the real block such that the real block is determined to be within a threshold distance of the user's eyes, the virtual object corresponding to the real block can perform an associated functionality in the VR environment.

In some examples, users can stack real blocks to cause virtual content corresponding to the real blocks to change. For instance, if a user stacks two or more real blocks, the virtual houses can change to a virtual multi-storied apartment building. Additional and/or alternative examples are described below.

Additional and/or alternative real objects can be integrated into the real scene and consequently can be integrated into the VR environment via virtual content that corresponds to the real objects. As described above, same or similar examples can apply in a MR environment.

In an additional and/or alternative example, a virtual diagram of an electric circuit can be associated with a circuit building VR application. A center of the virtual scene can include a virtual diagram of an electric circuit with missing components, such as switches, batteries, and light bulbs. Several of the virtual blocks can appear as transparent cubes with individual of the missing components (e.g., switches, batteries, or light bulbs) floating within. A user can learn about the basics of electricity and/or the conventions of electrical circuit diagrams, and can place virtual blocks including the missing components in positions corresponding to the missing components in the electric circuit. Each component can be attached to a target functionality, which raises a matched boolean flag when the virtual object touches its target. That is, based at least in part on determining that the virtual block enters within a threshold distance of a target identified in the virtual electrical circuit diagram, the target functionality can be effectuated in the VR environment. As the correct components are put in place in the virtual circuit, the virtual circuit closes and begins to work. For instance, a virtual light bulb can illuminate, a virtual engine can start running, etc.

In an additional and/or alternative example, a user can design a virtual race track and drive a virtual car on the virtual race track. The virtual race track can be associated with a race track VR application. Several of the real blocks can be defined as key-points (control points of a closed spline) and the virtual race track can be created between them (as a spline). An additional real object can correspond to a virtual steering wheel in the VR environment. The virtual steering wheel can have rotation functionality attached. As the user picks up and rotates the real object, a virtual car can start up and the user can navigate between the virtual and real obstacles by interacting with the real object.

FIG. 1 is a schematic diagram showing an example environment 100 for providing users with a tactile VR experience and/or MR experience. More particularly, the example environment 100 can include a service provider 102, one or more networks 104, one or more users 106 (e.g., user 106A, user 106B, etc.) and one or more devices 108 (e.g., device 108A, device 108B, etc.) associated with the one or more users 106. FIG. 1 is described in the context of a VR experience; however, environment 100 can also be applicable to MR experiences.

The service provider 102 can be any entity, server(s), platform, console, computer, etc., that facilitates tracking users 106 and real objects in a real scene to enable users 106 to engage in a tactile VR experience. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can receive data from a sensor. Based at least in part on receiving the data, the service provider 102 can determine that a user (e.g., user 106A, user 106B, etc.) that is physically present in the real scene interacts with a real object that is physically present in the real scene via an interaction. The service provider 102 can access a virtual element corresponding to the real object and a graphical element corresponding to the real object that can change depending on virtual environments associated with different VR applications. The service provider 102 can render the graphical element in a virtual environment of the virtual environments via a display of a VR device (e.g., device 108A, device 108B, etc.) and/or cause the graphical element to be rendered in a virtual environment of the virtual environments via a display of a VR device (e.g., device 108A, device 108B, etc.). In an example where more than one user is interacting in the virtual environment, the virtual content can be presented to individual users 106 based on a viewing perspective of the respective users (e.g., a location of a VR device within the real scene).

In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, Bluetooth, etc.). The networks 104 can facilitate communication between the server(s) 110 and the devices 108 associated with the one or more users 106.

Examples support scenarios where device(s) represented by the one or more server(s) 110 can include one or more computing devices that operate in a cluster or another clustered configuration to share resources, balance load, increase performance, provide fail-over support or redundancy, or for other purposes. Device(s) represented by the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device. Device(s) represented by the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, an image camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network.

Processing unit(s) (e.g., processor(s) 112) can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate interaction between the service provider 102 and the one or more devices 108. The components can represent pieces of code executing on a computing device. For example, the computer-readable media 114 can include an input module 116, an identification module 117, an interaction module 118, a modeling module 120, a presentation module 122, one or more application(s) 124, a database 125, etc. In at least some examples, the modules can be implemented as computer-readable instructions, various data structures, and so forth via at least one processing unit(s) (e.g., processor(s) 112) to provide tactile VR and/or MR experiences. Functionality to perform these operations can be included in multiple devices or a single device.

In some examples, multiple users 106 can interact in a same real scene. Individual ones of the multiple users 106 can have VR or MR devices 108 and other individual ones of the multiple users 106 may not have a device 108 but can still interact with the real objects and the other users 106. In examples involving multiple users 106, functionality to perform the operations described herein can be performed on a single device or group of devices that is centralized for all users 106.

Depending on the exact configuration and type of the server(s) 110, the computer-readable media 114 can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The input module 116 is configured to receive data from one or more input peripheral devices (e.g., a keyboard, a mouse, a pen, a game controller, a voice input device, a touch input device, gestural input device, a tracking device, a mapping device, an image camera, a depth sensor, a physiological sensor, and the like). In at least one example, the one or more input peripheral devices can continually sense data throughout the VR and/or MR experience and, accordingly, the input module 116 can continually receive data from the one or more input peripheral devices throughout the VR and/or MR experience. In some examples, the one or more input peripheral devices can be integrated into the one or more server(s) 110 and/or other machines and/or devices 108. For instance, in such examples, the input module 116 can receive data from one or more sensors integrated into the one or more server(s) 110 and/or other machines and/or devices 108. In other examples, the one or more input peripheral devices can be communicatively coupled to the one or more server(s) 110 and/or other machines and/or devices 108. For instance, in such examples, the data can be received from sensors associated with real objects that are communicatively coupled to the one or more server(s) 110 via a network 104, as described above. The one or more input peripheral devices can be associated with a single device (e.g., OPTITRACK®, MICROSOFT® KINECT®, INTEL® Perceptual Computing SDK 2013, LEAP MOTION®, etc.) or separate devices.

As described above, in at least one example, the input module 116 can receive data from tracking devices that can include optical tracking devices (e.g., VICON®, OPTITRACK®), magnetic tracking devices, acoustic tracking devices, gyroscopic tracking devices, mechanical tracking systems, depth cameras (e.g., KINECT®, INTEL® RealSense, etc.), inertial sensors (e.g., INTERSENSE®, XSENS, etc.), combinations of the foregoing, etc. The tracking devices can output streams of volumetric data, skeletal data, perspective data, etc. in substantially real time. The streams of volumetric data, skeletal data, perspective data, etc. can be received by the input module 116 in substantially real time.

Volumetric data can correspond to a volume of space occupied by a body of a user (e.g., user 106A, user 106B, etc.) and/or real objects. Skeletal data can correspond to data used to approximate a skeleton, in some examples, corresponding to a body of a user (e.g., user 106A, user 106B, etc.) and/or real objects, and track the movement of the skeleton over time. The skeleton corresponding to the body of the user (e.g., user 106A, user 106B, etc.) can include an array of nodes that correspond to a plurality of human joints (e.g., elbow, knee, hip, etc.) that are connected to represent a human body. Perspective data can correspond to data collected from two or more perspectives that can be used to determine an outline of a body of a user (e.g., user 106A, user 106B, etc.) and/or an object from a particular perspective.

Combinations of the volumetric data, the skeletal data, and the perspective data can be used to determine body representations and/or object representations corresponding to users 106 and/or real objects, respectively. The body representations and/or object representations can approximate a body shape of a user (e.g., user 106A, user 106B, etc.) and/or an object shape of a real object. That is, volumetric data associated with a particular user (e.g., user 106A), skeletal data associated with a particular user (e.g., user 106A), and perspective data associated with a particular user (e.g., user 106A) can be used to determine a body representation that represents the particular user (e.g., user 106A). Similarly, volumetric data associated with a particular real object, skeletal data associated with a particular real object, and perspective data associated with a particular real object can be used to determine an object representation that represents the a particular real object. The object representation can correspond to the virtual element described herein. The body representations and/or object representations can be used by the interaction module 118 to determine interactions between users 106 and/or real objects.

In at least one example, in addition to the volumetric data, skeletal data, and/or perspective data, the input module 116 is further configured to receive data associated with positions (e.g., position data) and orientations (e.g., orientation data) of users 106 and their bodies in a global coordinate system. In some examples, the global coordinate system can be aligned with the geometry of the real scene. Additionally, the input module 116 is configured to receive data associated with positions (e.g., position data) and orientations (e.g., orientation data) of real objects in the global coordinate system.

The input module 116 is configured to receive data associated with the real scene that at least one user (e.g., user 106A, user 106B, etc.) is physically located. The input module 116 can be configured to receive the data from mapping devices associated with the one or more server(s) and/or other machines 110 and/or user devices 108, as described above. The mapping devices can include cameras and/or sensors, as described above. The cameras can include image cameras, stereoscopic cameras, trulight cameras, etc. The sensors can include depth sensors, color sensors, acoustic sensors, pattern sensors, gravity sensors, etc. The cameras and/or sensors can output streams of data in substantially real time. The streams of data can be received by the input module 116 in substantially real time. The data can include moving image data and/or still image data representative of a real scene that is observable by the cameras and/or sensors. Additionally, the data can include depth data.

The depth data can represent distances between real objects in a real scene observable by sensors and/or cameras and the sensors and/or cameras. The depth data can be based at least in part on infrared (IR) data, trulight data, stereoscopic data, light and/or pattern projection data, gravity data, acoustic data, etc. In at least one example, the stream of depth data can be derived from IR sensors (e.g., time of flight, etc.) and can be represented as a point cloud representative of the real scene. The point cloud can represent a set of data points or depth pixels associated with surfaces of real objects and/or the real scene configured in a three-dimensional coordinate system (e.g., the global coordinate system). The depth pixels can be mapped into a grid. The grid of depth pixels can indicate how far real objects in the real scene are from the cameras and/or sensors. The grid of depth pixels that correspond to the volume of space that is observable from the cameras and/or sensors can be called a depth space. The depth space can be utilized by the rendering module 130 (in the devices 108) for determining how to render virtual content that corresponds to real objects.

The identification module 117 is configured to determine an identification of a real object. In at least one example, the identification module 117 can access the data received by the input module 116. In some examples, the identification module 117 can determine position data and/or orientation data associated with each real object. In other examples, the identification module 117 can access position data and/or orientation data from the input module 116. In such examples, the input module 116 can receive position data and/or orientation data directly from sensors associated with the real objects. The position data indicates a position of a real object in the global coordinate system. The orientation data indicates an orientation of the real object in the global coordinate system. Based at least in part on the position data and orientation data, the identification module 117 can identify a real object. Each real object can be associated with a unique identifier. Data (e.g., position data, orientation data, tracking data, functionality data, etc.), virtual elements, graphical elements, etc. associated with each unique identifier can be stored in the database 125, as described below.

Additionally and/or alternatively, the identification module 117 can determine the identification for a real object that can be introduced to the environment 100. For instance, a user (e.g., user 106A) can acquire a new toy and can desire to introduce the new toy into the environment 100 so that the user (e.g., user 106A) can play with the new toy in the VR environment. In such examples, the identification module 117 can access data from the input module 116 associated with the new real object. The identification module 117 can receive, access, or determine a geometry of the new real object based on combinations of volumetric data, skeletal data, and perspective data, as described above. The identification module 117 can assign a unique identifier to the new real object. The modeling module 120, as described below, can generate a virtual element that maps to the geometry of the real object and the identification module 117 can associate the unique identifier with the virtual element. Furthermore, the identification module 117 can perform semantic recognition on the new real object to determine an identity of the real object. For instance, based at least in part on performing the semantic recognition, the identification module 117 can determine that the real object is a steering wheel, a model car, an animal, a kitchen utensil, etc. The modeling module 120 can generate graphical elements that correspond to the results of the semantic recognition and the identification module 117 can associate the graphical elements with the unique identifier. Additionally and/or alternatively, the identification module 117 can assign functionalities corresponding to graphical elements or the results of the semantic recognition to the unique identifier.

The interaction module 118 is configured to determine whether a user (e.g., user 106A) interacts with and/or causes an interaction with real objects. Based at least in part on the body representations corresponding to the users 106 and/or object representations, the interaction module 118 can determine that a user (e.g., user 106A) interacts with and/or causes an interaction with a real object. The interaction module 118 can determine that a user (e.g., user 106A) interacts and/or causes an interaction with a real object based at least in part on determining a position and rotation of the user (e.g., user 106A) and a position and rotation of the real object. As described above, during the VR and/or MR experience, the input module 116 can continually receive data and/or determine data associated with the position and rotation of each user (e.g., user 106A) and/or real object in a real scene. The data associated with the position and rotation of each user (e.g., user 106A) and/or real object can be used to determine derivative properties and the relation of each user (e.g., user 106A) and/or real object to other users 106 and/or real objects. Derivative properties can include a height of a real object above the calibrated real floor of the real scene, a distance between a center of a real object and a portion of a user's (e.g., user 106A) body (e.g., a left hand, a right hand, etc.), a change in a real object's position over time (e.g., velocity), a change in a real object's rotational position over time (e.g., rotational velocity), etc.

The interaction module 118 can leverage the derivative properties described above to determine interactions with real objects. Interactions can include a shaking interaction, a tapping interaction, a holding interaction, a kicking interaction, a rotating interaction, a stacking interaction, an aligning interaction, etc. Additionally and/or alternatively, determining interactions can include determining that a user (e.g., user 106A) moves a real object within a threshold distance of a particular body part (e.g., eyes, etc.), determining that the user (e.g., user 106A) sets the real object on the real floor, etc.

The interaction module 118 can determine a shake interaction based at least in part on accessing data associated with a position of a real object (e.g., position data) during a period of time. As described above, in some examples, the input module 116 can receive and/or determine position data and the position data can be stored in the database 125 in association with a unique identifier corresponding to the real object. The interaction module 118 can access position data and can apply a principal component analysis to the values associated with the position data corresponding to the real object. The principal component analysis can analyze movement of the real object along each of the axes in the global coordinate system (e.g., x-axis, y-axis, z-axis) during the period of time. Based at least in part on determining that the real object moved along a first axis during the period of time is a threshold amount greater than the real object moved along the other two axes during the period of time and that a number of zero-crossings (e.g., a position of the real object crosses an axis) during the period of time is above a predetermined threshold of zero-crossings, the interaction module 118 can determine that the user (e.g., user 106A) is shaking the real object. Based at least in part on determining that the user (e.g., user 106A) is shaking the real object, the interaction module 118 can determine various functionalities that can be performed by the virtual object corresponding to the real object. For instance, in a non-limiting example, based at least in part on determining that the user (e.g., user 106A) is shaking the real object, a virtual object corresponding to a seed box can sprinkle seeds in the VR environment.

In some examples, the functionalities can be based on an interaction and/or VR application. For instance, the functionalities can be based on a speed of the shaking interaction (e.g., as determined by a number of zero-crossings in a period of time), a number of shaking interactions that occurred prior to a shaking interaction, etc. For instance, a first shaking interaction with a real object can be associated with a first functionality and a second shaking interaction with a real object can be associated with a second, different functionality. Or, a shaking interaction at a rate determined to be above a predetermined threshold can be associated with a first functionality and a shaking interaction at a rate determined to be below a predetermined threshold can be associated with a second, different functionality. Furthermore, a shaking interaction at a rate determined to be above a first predetermined threshold can be associated with a first functionality and a shaking interaction at a rate determined to be above a second predetermined threshold can be associated with a second, different functionality.

In another example, the interaction module 118 can determine a tap interaction. For instance, the interaction module 118 can leverage the derivative properties and data stored in the database 125 to monitor the velocity of the user's (e.g., user 106A) hands. In at least one example, the interaction module 118 can determine that when the user's (e.g., user 106A) hands are in close proximity to a real object and have a velocity below a threshold, the user (e.g., user 106A) taps the real object. Based at least in part on determining that the user (e.g., user 106A) taps the real object, the interaction module 118 can determine various functionalities that can be performed by the virtual object corresponding to the real object. The various functionalities can be based on VR applications, a force associated with the tap interaction, a position of the tap interaction on the real object, etc. For instance, in a non-limiting example, based at least in part on determining that the user (e.g., user 106A) taps the real object, a graphical element corresponding to the virtual object can be replaced with another graphical element corresponding to the virtual object. As a non-limiting example, a graphical element representing a house can be replaced with a graphical element representing a tool box. The house and the tool box can be associated with a same VR application.

In yet another example, the interaction module 118 can determine a holding interaction. For instance, the interaction module 118 can access data received by the input module 116 and/or stored in the database 125 to determine a distance between a user's (e.g., user 106A) hands. The interaction module 118 can access and/or determine the physical dimensions of a real object and, based at least in part on determining that the distance between the user's (e.g., user 106A) hands is within a threshold of the physical dimensions of the real object, the interaction module 118 can determine that the user (e.g., user 106A) is holding the real object.

In some examples, based at least in part on determining that the user (e.g., user 106A) is holding the real object, the interaction module 118 can detect additional and/or alternative interactions that can trigger various functionalities. As described above, the various functionalities can be based on an interaction and/or VR application.

For instance, based at least in part on determining that the user (e.g., user 106A) is holding the real object, the interaction module 118 can detect that the user (e.g., user 106A) moves the real object within a threshold distance of a portion of the body (e.g., eyes, head, ears, etc.). Based at least in part on detecting that the user (e.g., user 106A) moves the real object within a threshold distance of a portion of the body (e.g., eyes, head, ears, etc.), the interaction module 118 can determine different functionalities. For instance, based at least in part on detecting that the user (e.g., user 106A) moves the real object within a threshold distance of the user's (e.g., user 106A) eyes, the interaction module 118 can determine a binocular functionality. The binocular functionality can enable a user (e.g., user 106A) to see new virtual content that was not previously rendered on the display, such as a night sky, solar system, cloud system, etc. Or, base at least in part on detecting that the user (e.g., user 106A) moves the real object within a threshold distance of one of the user's (e.g., user 106A) ears, the interaction module 118 can determine a sound functionality.

In an additional or alternative example, based at least in part on detecting that the user (e.g., user 106A) is holding the real object and determining that a user (e.g., user 106A) moves through a virtual opening (e.g., a portal) that appears on the VR display, the interaction module 118 can determine a portal functionality. The portal functionality can enable a user to enter into a new virtual environment, access a virtual menu, etc.

In at least one example, the interaction module 118 can access the position data to determine that a first real object is within a threshold distance of a second real object and/or a position of the first real object in relation to the second real object. For instance, the first real object can be stacked on top of the second real object. Or, the first real object can be aligned with the second real object. In some cases, two or more real objects can be determined to be stacked and/or aligned. Based at least in part on determining that the user (e.g., user 106A) stacks and/or aligns the real objects, the interaction module 118 can determine various functionalities that can be performed by the virtual objects corresponding to the real objects. For instance, in a non-limiting example, based at least in part on determining that the user (e.g., user 106A) stacks and/or aligns two or more real objects, graphical elements corresponding to each of the virtual objects can be replaced with another graphical element corresponding to the stacked and/or aligned real objects. That is, the other graphical element can be rendered on top of the virtual elements corresponding each of the real objects that are stacked and/or aligned. In some examples, the graphical element can be dynamically generated using procedural modeling, described below. As a non-limiting example, graphical elements representing houses can be replaced with a graphical element representing an apartment building or strip-mall, based on determining that two or more real objects are stacked or aligned, respectively.

The modeling module 120 is configured to access and/or generate virtual elements and/or graphical elements that correspond to individual real objects. In some examples, as described above, the virtual elements and/or graphical elements correspond to unique identifiers that are associated with the real objects. In such examples, the modeling module 120 can access the virtual elements and/or graphical elements by accessing the database 125. In other examples, the modeling module 120 can further be configured to generate virtual elements and/or graphical elements. For instance, the modeling module 120 can leverage combinations of volumetric data, skeletal data, and perspective data to determine object representations (e.g., virtual elements) corresponding to real objects. Additionally and/or alternatively, the modeling module 120 can generate graphical elements based at least in part on procedural modeling. Procedural modeling enables the modeling module 120 to access and/or receive tracking data and/or depth data associated with the users 106 and/or real objects and generate graphical content that maps to the real objects and/or users 106 in the virtual environments. The graphical elements can depend on the VR applications, as described above. For instance, as a non-limiting example, a real object (e.g., a block) can be associated with a graphical element representative of a house in a first virtual environment associated with a first VR application but can be associated with a graphical element representative of a battery in a second virtual environment associated with a second VR application. That is, the real object can be utilized in a variety of virtual environments associated with a variety of VR applications. The virtual content rendered in the virtual environment can change based on the VR application.

The presentation module 122 is configured to send rendering data to devices 108 for presenting virtual content via the devices 108. The presentation module 122 can access data associated with instructions for rendering virtual content. The instructions can be determined by the one or more applications 124.

Applications (e.g., application(s) 124) are created by programmers to fulfill specific tasks. For example, applications (e.g., application(s) 124) can provide utility, entertainment, educational, and/or productivity functionalities to users 106 of devices 108. Applications (e.g., application(s) 124) can be built into a device (e.g., telecommunication, text message, clock, camera, etc.) or can be customized (e.g., games, news, transportation schedules, online shopping, etc.). Application(s) 124 can provide users 106 various functionalities, as described above.

The database 125 can store virtual elements, graphical elements, data associated with functionalities corresponding to the graphical elements, data associated with position data, tracking data, etc., etc. In at least one example, the database 125 can include data structures, including data tables, data indexes, etc. Each real object can be associated with a unique identifier, as described above. The database 125 can map virtual elements, graphical elements, data associated with functionalities corresponding to the graphical elements, data associated with position data, tracking data, etc., etc. to each of the unique identifiers. For instance, a virtual element can be mapped to the unique identifier. Additionally, one or more graphical elements that can be rendered on top of the virtual element can be mapped to the unique identifier. Interactions can be mapped to individual graphical elements. In some examples, each of the interactions can have a functionality that can be mapped to the graphical element and interaction. That is, each interaction associated with a graphical element can define a particular functionality associated with the graphical element. For instance, as described above, in a VR toy room application, a virtual block associated with a real block can cause virtual snow or virtual rain to fall from the virtual block in a VR environment responsive to a particular interaction (e.g., a shake interaction) with the real block.

A non-limiting example of a data table that can be stored in the database 125 is provided below in TABLE 1. Additional and/or alternative data structures can be used to store data associated with each of the real objects.

TABLE 1

| Unique Identifier | Virtual Element | VR Application | Graphical Element | Triggering Action | Functionality |
|---|---|---|---|---|---|
| A | A | Toy Box: Mushroom Land | Tool Box (default) | Determine first shake interaction | Cause virtual rain to fall from virtual object |
| | | | | Determine second shake interaction subsequent to first shake interaction | Cause virtual snow to fall from virtual object |
| | | | | Determine throw interaction | Cause virtual content surrounding landing position to appear to explode |
| | | | | Determine tap interaction with real object | Change to Graphical Element: Brick House |
| | | | Brick House | Determine real object is set on real floor | Cause additional virtual content to appear around real object |
| | | Electrical Circuit | Light Bulb | Determine real object is set on real floor within threshold distance of missing component position | Cause light bulb to illuminate if all other component are in place |

In some examples, the one or more users 106 can operate corresponding devices 108 (e.g., user devices 108) to perform various functions associated with the devices 108. Device(s) 108 can represent a diverse variety of device types and are not limited to any particular type of device. Examples of device(s) 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the devices 108 can include VR/MR devices (e.g., CANON® MREAL® System, MICROSOFT® HOLOLENS®, etc.). VR/MR devices can include one or more sensors and a VR/MR display, as described below in the context of FIGS. 2A and 2B. In FIG. 1, devices 108A and 108B are wearable computers (e.g., head mount devices); however, the devices 108 can be any other device as described above.

Device(s) 108 can include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, an image camera, a depth sensor, a physiological sensor, and the like) and/or output peripheral devices (e.g., a display, a printer, audio speakers, a haptic output, and the like). As described above, in some examples, the I/O devices can be integrated into the one or more server(s) 110 and/or other machines and/or devices 108. In other examples, the one or more input peripheral devices can be communicatively coupled to the one or more server(s) 110 and/or other machines and/or devices 108. One or more of the input peripheral devices can be associated with a single device (e.g., MICROSOFT® KINECT®, INTEL® Perceptual Computing SDK 2013, LEAP MOTION®, etc.) or separate devices.

Figure 2A:
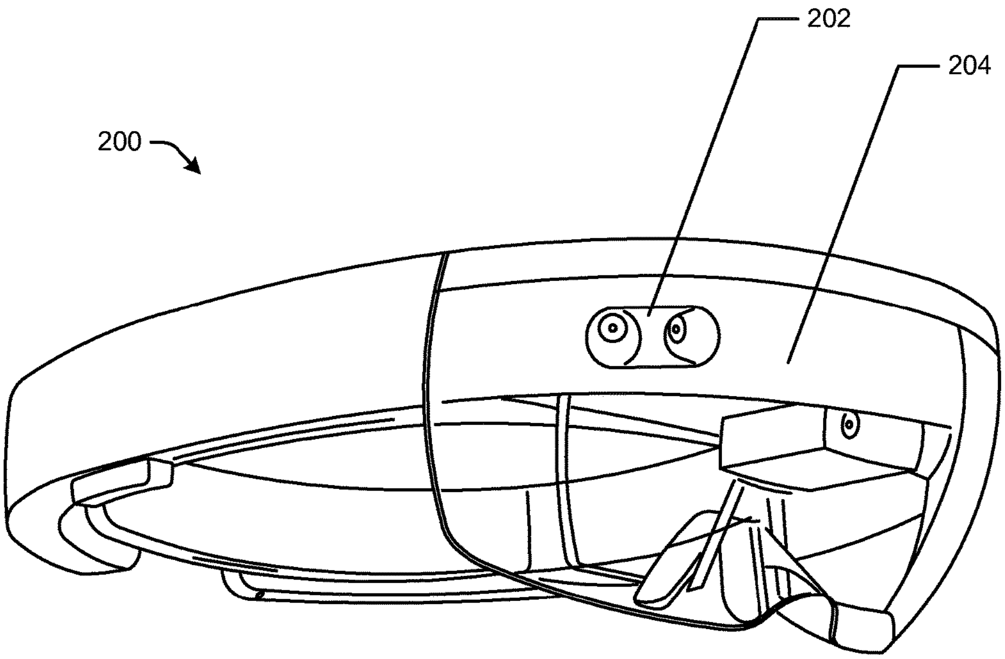
FIG. 2A is a schematic diagram showing an example of a head mounted VR and/or MR display device.
Figure 2B:
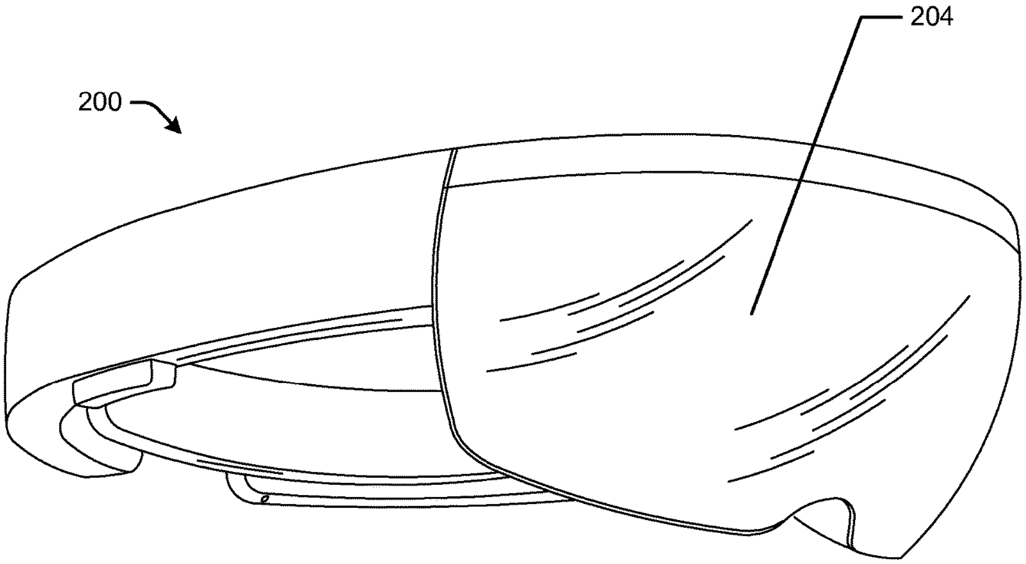
FIG. 2B is a schematic diagram showing an example of a head mounted VR and/or MR display device.

FIGS. 2A and 2B are schematic diagrams showing an example of a head mounted VR and/or MR display device 200. As illustrated in FIG. 2A, the head mounted VR display device 200 can include one or more sensors 202 and a display 204. For illustrative purposes, the display 204 is transparent. However, the display 204 may not be transparent, as illustrated in FIG. 2B. The one or more sensors 202 can include tracking technology, including but not limited to, depth cameras and/or sensors, inertial sensors, optical sensors, etc., as described above. Additionally or alternatively, the one or more sensors 202 can include one or more physiological sensors for measuring a user's heart rate, breathing, skin conductance, temperature, etc.

In some examples, as illustrated in FIG. 2A, the one or more sensors 202 can be mounted on the head mounted VR display device 200. The one or more sensors 202 correspond to inside-out sensing sensors; that is, sensors that capture information from a first person perspective. In additional or alternative examples, the one or more sensors can be external to the head mounted VR display device 200 and/or devices 108. In such examples, the one or more sensors can be arranged in a room (e.g., placed in various positions throughout the room), associated with a device, etc. Such sensors can correspond to outside-in sensing sensors; that is, sensors that capture information from a third person perspective. In yet another example, the sensors can be external to the head mounted VR display device 200 but can be associated with one or more wearable devices configured to collect data associated with the user (e.g., user 106A, user 106B, etc.). Additionally and/or alternatively, the sensors can be external to the head mounted VR display device 200 and can be associated with individual real objects. In such examples, the input module 116 can receive data (e.g., tracking data, position data, orientation data, etc.) directly from the sensors associated with the real objects.

The display 204 can present virtual content to the one or more users 106 in a VR environment. The virtual content can appear differently to different users (e.g., user 106A, user 106B, etc.) based on the users' perspectives and/or the location of the devices (e.g., device 108A, device 108B, etc.) in the global coordinate system. For instance, the size of a virtual object can be different based on a proximity of a user (e.g., user 106A, user 106B, etc.) and/or device (e.g., device 108A, device 108B, etc.) to a virtual object. Additionally or alternatively, the shape of the virtual object can be different based on the vantage point of a user (e.g., user 106A, user 106B, etc.) and/or device (e.g., device 108A, device 108B, etc.). For instance, a virtual object can have a first shape when a user (e.g., user 106A, user 106B, etc.) is looking at the virtual object straight on and can have a second shape when a user (e.g., user 106A, user 106B, etc.) is looking at the virtual object from the side.

The devices 108 can include one or more processing unit(s) (e.g., processor(s) 126), computer-readable media 128, at least including a rendering module 130, and one or more applications 132. The one or more processing unit(s) (e.g., processor(s) 126) can represent same units and/or perform same functions as processor(s) 112, described above. Computer-readable media 128 can represent computer-readable media 114 as described above. Computer-readable media 128 can include components that facilitate interaction between the service provider 102 and the one or more devices 108. The components can represent pieces of code executing on a computing device, as described above. Computer-readable media 128 can include at least the rendering module 130. The devices 108 can further include application(s) 132, that can correspond to same applications as application(s) 128 or can be different applications.

In at least one example, the rendering module 130 can receive rendering data from the presentation module 122. The rendering module 130 can utilize the rendering data to render virtual content via a processor 126 (e.g., a GPU) on the device (e.g., device 108A, device 108B, etc.). In other examples, the presentation module 122 can render the virtual content and can send a rendered result as rendering data to the device (e.g., device 108A, device 108B, etc.). The device (e.g., device 108A, device 108B, etc.) can present the rendered virtual content on the display 204. FIG. 1 shows an example of rendered virtual content that can be presented on the display 204. As shown, virtual objects 134 corresponding to a user's (e.g., user 106A) hands can be rendered on the display 204. Additionally, a virtual object 136 (e.g., a house) corresponding to a real object (e.g., a real block) can be rendered on the display 204. The example of rendered virtual content shown in FIG. 1 is but one example of rendered virtual content and additional and/or alternative VR environments can be rendered on the display 204.

The techniques discussed above can be implemented in hardware, software, or a combination thereof. In the context of software, operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types.

Figure 3:
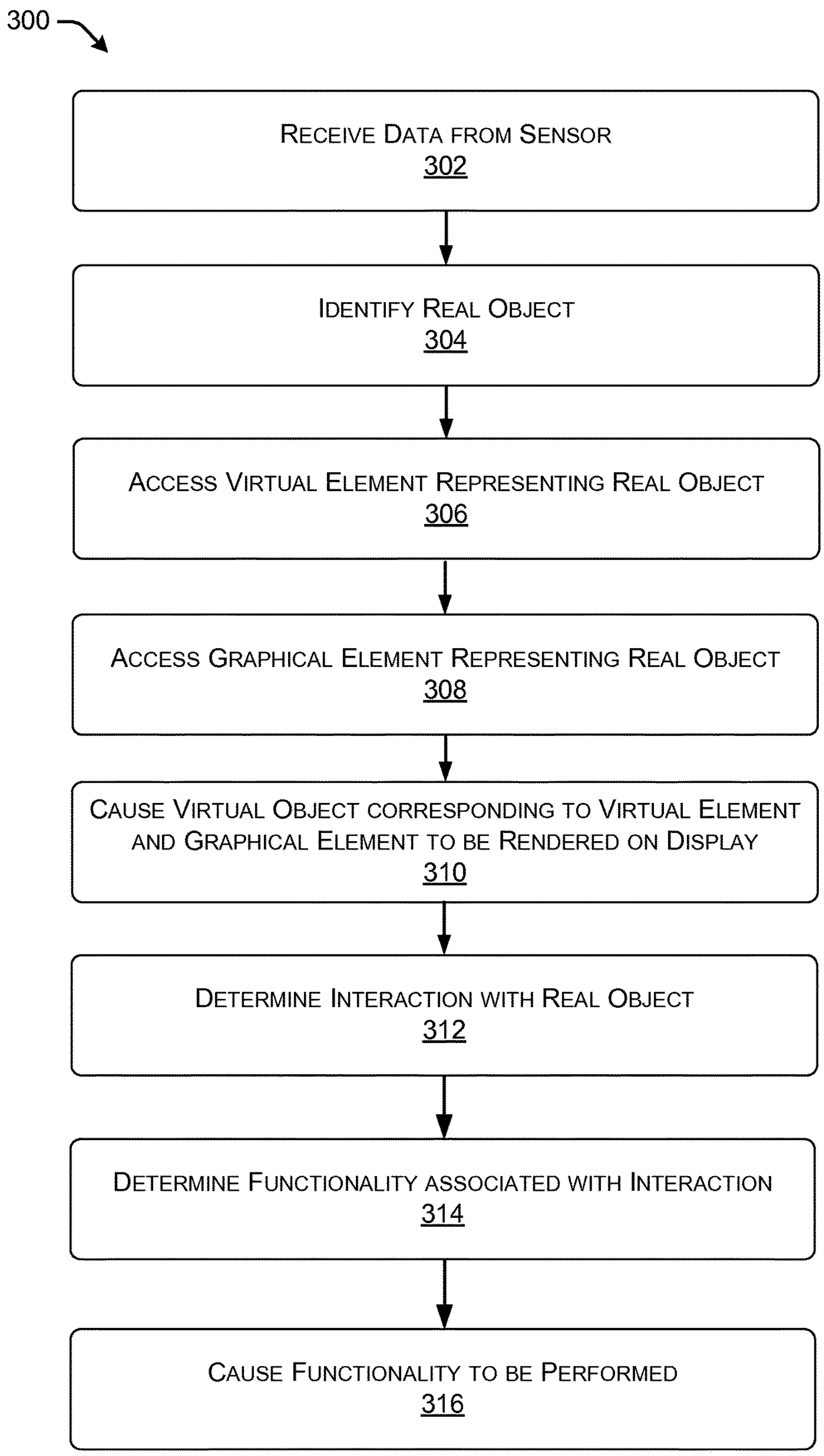
FIG. 3 is a flow diagram showing an example process for causing a functionality associated with a virtual object to be performed in a VR environment based at least in part on determining an interaction with a real object in a real scene.

FIG. 3 is a flow diagram showing an example process 300 for causing a functionality associated with a virtual object to be performed in a VR environment based at least in part on determining an interaction with a real object in a real scene. It should be appreciated that the logical operations described herein with respect to FIG. 3, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

Block 302 illustrates receiving data from a sensor. The input module 116 can receive data from one or more input peripheral devices (e.g., a keyboard, a mouse, a pen, a game controller, a voice input device, a touch input device, a gestural input device, a tracking device, a mapping device, an image camera, a depth sensor, a physiological sensor, and the like), as described above. As described above, the input module 116 can continually receive data from the one or more peripheral devices throughout the VR and/or MR experience.

Figure 4:
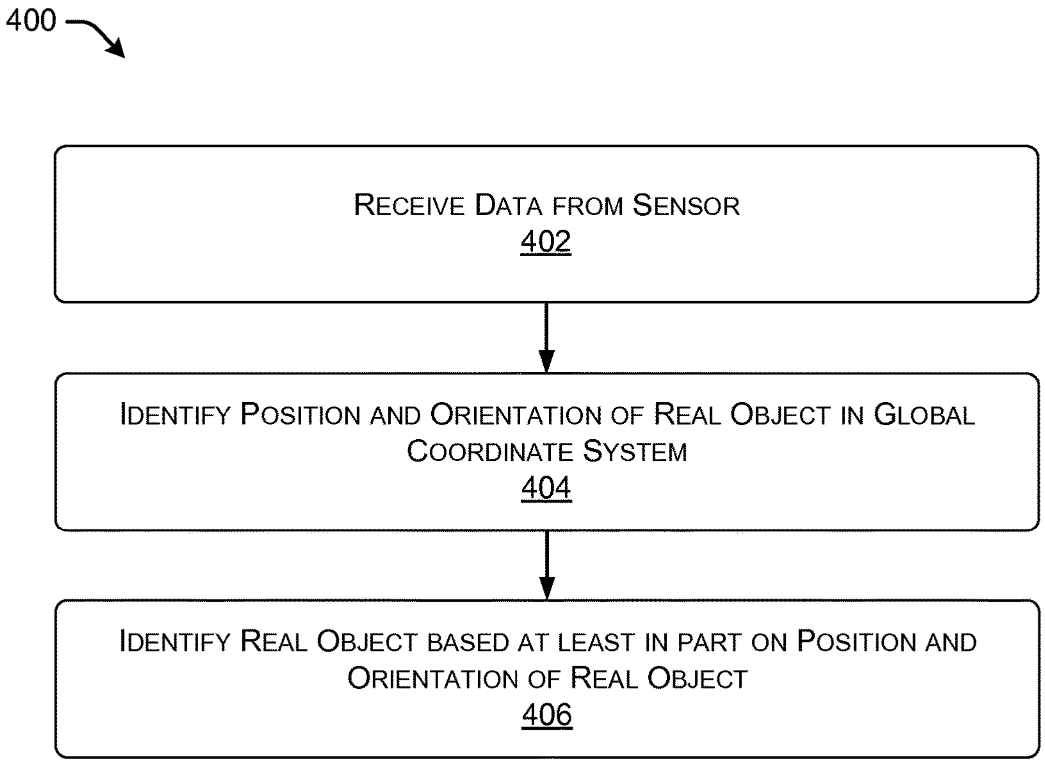
FIG. 4 is a flow diagram showing an example process for identifying real objects based at least in part on data received from a sensor.

Block 304 illustrates identifying a real object. The identification module 117 is configured to determine an identification of a real object. FIG. 4, described below, illustrates an example process 400 for identifying real objects based at least in part on data received from the sensor.

Block 306 illustrates accessing a virtual element representing the real object. The modeling module 120 is configured to access and/or generate virtual elements that correspond to individual real objects. As described above, based at least in part on identifying the real object, the modeling module 120 can access virtual elements from the database 125. For instance, in some examples, the modeling module 120 can leverage a unique identifier associated with the real object to access the virtual element associated with the unique identifier. In at least one example, for instance if a real object is newly introduced to the system, the modeling module 120 can generate a virtual element that represents the real object, as described below in the discussion of FIG. 6.

Block 308 illustrates accessing a graphical element representing the real object. The modeling module 120 is configured to access and/or generate graphical elements that correspond to individual real objects. As described above, based at least in part on identifying the real object, the modeling module 120 can access graphical elements from the database 125. For instance, in some examples, the modeling module 120 can leverage a unique identifier associated with the real object to access the graphical elements associated with the unique identifier. In at least one example, for instance if a real object is newly introduced to the system, the modeling module 120 can generate one or more graphical elements that correspond to the real object, as described below in the discussion of FIG. 6.

Block 310 illustrates causing a virtual object corresponding to the virtual element and the graphical element to be rendered on a display. The presentation module 122 is configured to send rendering data to devices 108 for presenting virtual content via the devices 108. The presentation module 122 can access data associated with instructions for rendering virtual content. The instructions can be determined by the one or more applications 124. The rendering module 130 can receive rendering data from the service provider 102. In some examples, the rendering module 130 can utilize the rendering data to render virtual content via a processor 126 (e.g., a GPU) on the device (e.g., device 108A, device 108B, etc.). In other examples, the presentation module 122 can render the virtual content and can send a rendered result as rendering data to the device (e.g., device 108A, device 108B, etc.). The device (e.g., device 108A, device 108B, etc.) can present the rendered virtual content on the display 204.

Block 312 illustrates determining an interaction with a real object. The interaction module 118 can access data received from the input module 116 to determine an interaction with a real object. In some examples, the interaction module 118 can access data received by the input module 116 prior to rendering the virtual object. In other examples, the interaction module 118 can access data received by the input module 116 subsequent to rendering the virtual object. The interaction module 118 is configured to determine whether a user (e.g., 106A) interacts and/or causes an interaction with real objects. Based at least in part on the body representations corresponding to the users 106 and/or object representations, the interaction module 118 can determine that a user (e.g., 106A) interacts and/or causes an interaction with a real object. The interaction module 118 can leverage the derivative properties described above to determine interactions with real objects, as described above. Interactions can include a shaking interaction, a tapping interaction, a holding interaction, a kicking interaction, a rotating interaction, a stacking interaction, an aligning interaction, etc. Additionally and/or alternatively, determining interactions can include determining that a user (e.g., user 106A) moves a real object within a threshold distance of a particular body part (e.g., eyes, etc.), determining that the user (e.g., user 106A) sets the real object on the real floor, etc.

Block 314 illustrates determining functionality associated with the interaction. The interaction module 118 can determine functionalities associated with the virtual object based on the graphical element of the virtual object. That is, the interaction module 118 can determine which functionalities a particular graphical element is capable of performing. Based at least in part on determining the interaction, the interaction module 118 can identify a functionality of the functionalities that corresponds to the interaction. In at least one example, the interaction module 118 can access data stored in the database 125 to determine the functionality that corresponds to the interaction. For instance, based at least in part on determining that the user (e.g., user 106A) performs a particular interaction, the interaction module 118 can map the particular interaction to the corresponding functionality that can be performed.

Block 316 illustrates causing the functionality to be performed in the VR environment. Based at least in part on determining which functionality can be performed, the interaction module 118 can send data to the rendering module 130. The rendering module 130 can utilize the data to render a new frame on a display (e.g., display 204) of the VR device (e.g., device 200). Based at least in part on rendering the new frame, each virtual object in the VR environment can be updated. As a result, the functionality can be performed by a corresponding virtual object in the VR environment. As described above, the functionality can be a change to the graphical element associated with the virtual object, a behavior that can be performed by the virtual object, etc. In additional and/or alternative examples, updated frames can be rendered by the presentation module 122 and the presentation module 122 can send the rendered result to the rendering module 130.

FIG. 4 is a flow diagram showing an example process 400 for identifying real objects based at least in part on data received from a sensor.

Block 402 illustrates receiving data from a sensor. The input module 116 can receive data from one or more input peripheral devices (e.g., a keyboard, a mouse, a pen, a game controller, a voice input device, a touch input device, a gestural input device, a tracking device, a mapping device, an image camera, a depth sensor, a physiological sensor, and the like), as described above. As described above, the input module 116 can continually receive data from the one or more peripheral devices throughout the VR and/or MR experience.

Block 404 illustrates identifying a position and an orientation of a real object in a global coordinate system. In at least one example, the identification module 117 can access the data received by the input module 116. In some examples, the identification module 117 can determine position data and/or orientation data associated with each real object. In other examples, the identification can access position data and/or orientation data from the input module 116. In such examples, the input module 116 can receive position data and/or orientation data directly from sensors associated with the real objects, as described above.

Block 406 illustrates identifying a real object based at least in part on the position and the orientation of the real object. Based at least in part on the position data and the orientation data, the identification module 117 can identify a real object. Each real object can be associated with a unique identifier.

Additional and/or alternative processes can be used for identifying real objects. For instance in some examples, real objects can be pre-tagged with markers in unique configurations. The unique configurations can be mapped to a unique identifier. A sensor can identify the markers and the unique configuration. Based on identifying the unique configuration, the identification module 117 can access the unique identifier and/or data associated with the unique identifier. As described above, data can be stored with the unique identifier in the database 125. For instance, data indicating the geometry of a real object corresponding to the unique identifier can be stored with the unique identifier.

Figure 5:
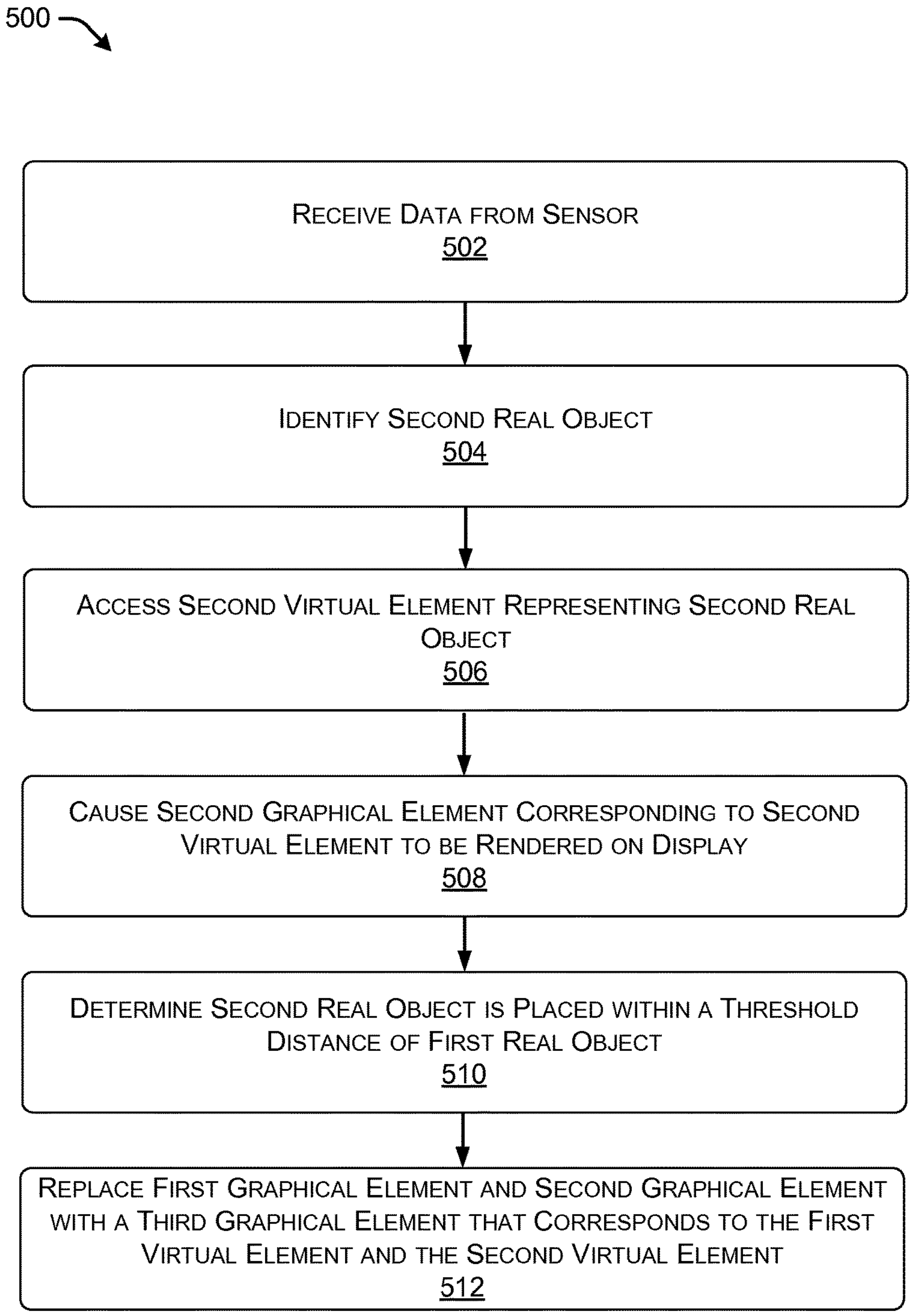
FIG. 5 is a flow diagram showing an example process for replacing a first graphical element and a second graphical element with a third graphical element in a VR environment based at least in part on determining an interaction with two real objects in a real scene.

FIG. 5 is a flow diagram showing an example process 500 for replacing a first graphical element and a second graphical element with a third graphical element in a VR environment based at least in part on determining an interaction with two real objects in a real scene.

Block 502 illustrates receiving data from a sensor. The input module 116 can receive data from one or more input peripheral devices (e.g., a keyboard, a mouse, a pen, a game controller, a voice input device, a touch input device, a gestural input device, a tracking device, a mapping device, an image camera, a depth sensor, a physiological sensor, and the like), as described above. As described above, the input module 116 can continually receive data from the one or more peripheral devices throughout the VR and/or MR experience.

Block 504 illustrates identifying a second real object. Based at least in part on position data and orientation data, the identification module 117 can identify a real object, as described above. In at least one example, the identification module 117 can determine that the second real object is different from the first real object. For instance, the position and orientation of the second real object can be different from the position and orientation of the first real object. Or, the second real object can have a unique configuration of markers that differentiate it from the first real object. Additional and/or alternative processes for identifying the second real object can be employed.

Block 506 illustrates accessing a second virtual element representing the second real object. As described above, the modeling module 120 is configured to access and/or generate virtual elements and/or graphical elements that correspond to individual real objects. In some examples, the modeling module 120 can leverage a unique identifier associated with the second real object to access the virtual element representing the real object. In such examples, as described above, the modeling module 120 can access virtual elements and/or graphical elements that correspond to the unique identifier that is associated with the real objects. In other examples, the modeling module 120 can further be configured to generate the graphical elements based at least in part on procedural modeling.

Block 508 illustrates causing a second graphical element corresponding to the second virtual element to be rendered on the display. In some examples, the modeling module 120 can leverage a unique identifier associated with the second real object to access a second graphical element representing the second real object. The presentation module 122 is configured to send rendering data to devices 108 for presenting virtual content via the devices 108. The presentation module 122 can access data associated with instructions for rendering virtual content, such as the second graphical element. The instructions can be determined by the one or more applications 124. The rendering module 130 can receive rendering data from the service provider 102. In some examples, the rendering module 130 can utilize the rendering data to render virtual content via a processor 126 (e.g., a GPU) on the device (e.g., device 108A, device 108B, etc.). In other examples, the presentation module 122 can render the virtual content and can send a rendered result as rendering data to the device (e.g., device 108A, device 108B, etc.). The device (e.g., device 108A, device 108B, etc.) can present the rendered virtual content on the display 204, as described above.

Block 510 illustrates determining that the second real object is placed within a threshold distance of the first real object. The interaction module 118 is configured to determine whether a user (e.g., 106A) interacts and/or causes an interaction with real objects. Based at least in part on the object representations derived from the data received from the sensor, the interaction module 118 can determine that the first real object and corresponding virtual object are placed within a threshold distance of a second real object and corresponding virtual object. For instance, in at least one example, a user (e.g., user 106A) can stack the first real object on top of the second real object, or can stack the second real object on top of the first real object. In another example, a user (e.g., user 106A) can set the first real object next to the second real object.

Block 512 illustrates replacing the first graphical element and second graphical element with a third graphical element that corresponds to the first virtual element and the second virtual element. In at least one example, based at least in part on determining that the second real object is placed within a threshold distance of the first real object, the interaction module 118 can determine that a stacking interaction or an aligning interaction has occurred. As a result, the interaction module 118 can send data to the presentation module 122 and/or the rendering module 130 instructing the presentation module 122 and/or the rendering module 130 to modify the virtual object. In some examples, the presentation module 122 and/or the rendering module 130 can replace the first graphical element and the second graphical element with a third graphical element that corresponds to the first virtual element and the second virtual element. For instance, based at least in part on determining a stacking interaction, graphical elements representing virtual houses that correspond to individual real objects can be replaced with a new graphical element that represents a multi-story office building. Or, based at least in part on determining an aligning interaction, graphical elements representing virtual houses that correspond to individual real objects can be replaced with a new graphical element that represents a strip-mall. In each example, the new graphical element can be rendered on top of the first virtual element and the second virtual element.

Figure 6:
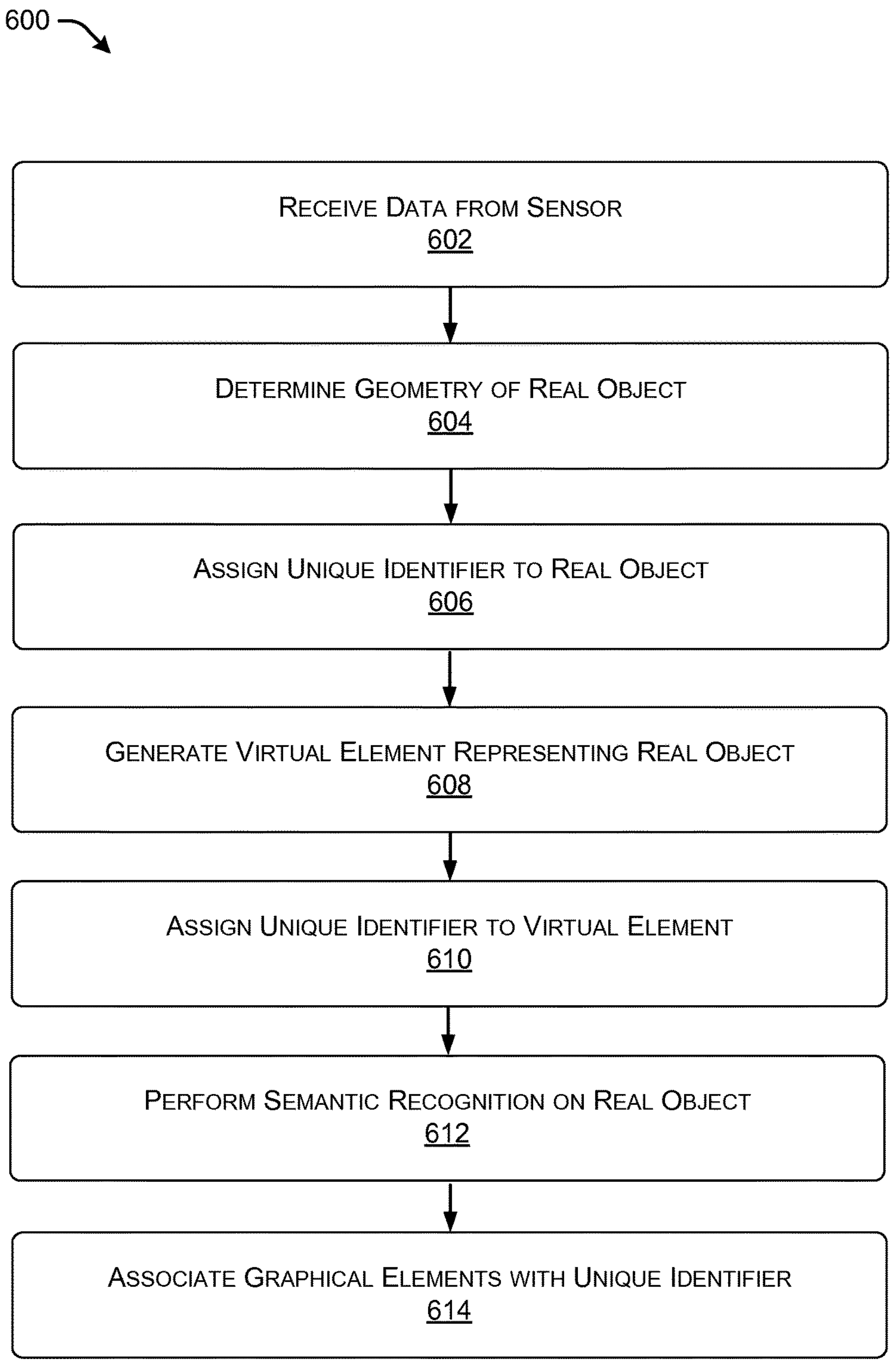
FIG. 6 is a flow diagram showing an example process for introducing a new real object into the techniques described herein.

As described above, the identification module 117 can determine the identification of a real object that can be introduced to the environment 100. For instance, the identification module 117 can determine the identification of a new toy that the user (e.g., user 106A) desires to integrate into the techniques described herein. FIG. 6 is a flow diagram showing an example process 600 for introducing a new real object into the techniques described herein.

Block 602 illustrates receiving data from a sensor. The input module 116 can receive data from one or more input peripheral devices (e.g., a keyboard, a mouse, a pen, a game controller, a voice input device, a touch input device, a gestural input device, a tracking device, a mapping device, an image camera, a depth sensor, a physiological sensor, and the like), as described above. As described above, the input module 116 can continually receive data from the one or more peripheral devices throughout the VR and/or MR experience.

Block 604 illustrates determining the geometry of a real object. The identification module 117 can determine a geometry of the new real object based on combinations of volumetric data, skeletal data, and perspective data that can be used to determine object representations corresponding to or real objects, as described above.

Block 606 illustrates assigning a unique identifier to the real object. The identification module 117 can assign a unique identifier to the new real object. The unique identifier can be stored in the database 125, as described above.

Block 608 illustrates generating a virtual element representing the real object. The modeling module 120 can generate a virtual element that maps to the geometry of the real object, as described above.

Block 610 illustrates assigning the unique identifier to the virtual element. The modeling module 120 can associate the virtual element with the unique identifier in the database 125.

Block 612 illustrates performing semantic recognition on the real object. The identification module 117 can perform semantic recognition on the new real object to determine an identity of the real object. For instance, based at least in part on performing the semantic recognition, the identification module 117 can determine that the real object is a steering wheel, a model car, an animal, a kitchen utensil, etc.

Block 614 illustrates associating graphical elements with the unique identifier. In some examples, the modeling module 120 can generate graphical elements that correspond to the results of the semantic recognition and can associate the graphical elements with the unique identifier. For instance, if the semantic recognition outputs a result that a real object is a model car, the modeling module 120 can generate graphical elements associated with different shapes, styles, colors, etc. of the model car. Or, if the semantic recognition outputs a result that a real object is a ball, the modeling module 120 can generate graphical elements associated with different ball-shaped objects. In other examples, the modeling module 120 can access pre-existing graphical elements that correspond to the virtual element generated for the new real object. Additionally and/or alternatively, the identification module 117 can assign functionalities corresponding to graphical elements or the results of the semantic recognition to the unique identifier.

Figure 7C:
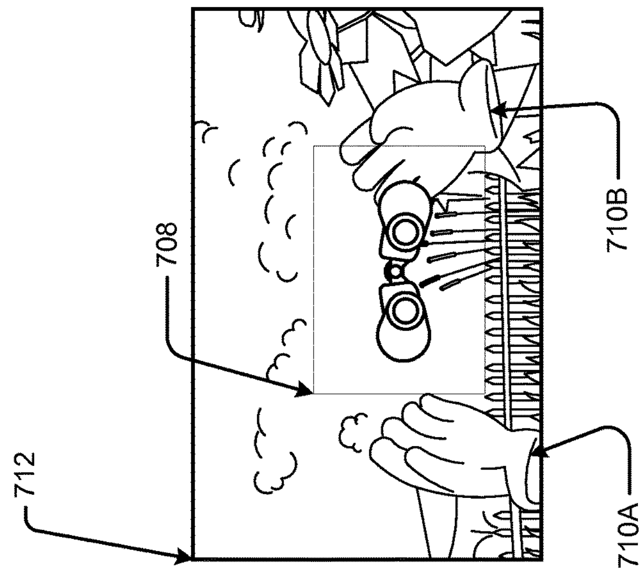
FIG. 7C is a schematic diagram showing an example of the corresponding virtual object rendered in the VR environment associated with the first VR application.
Figure 7B:
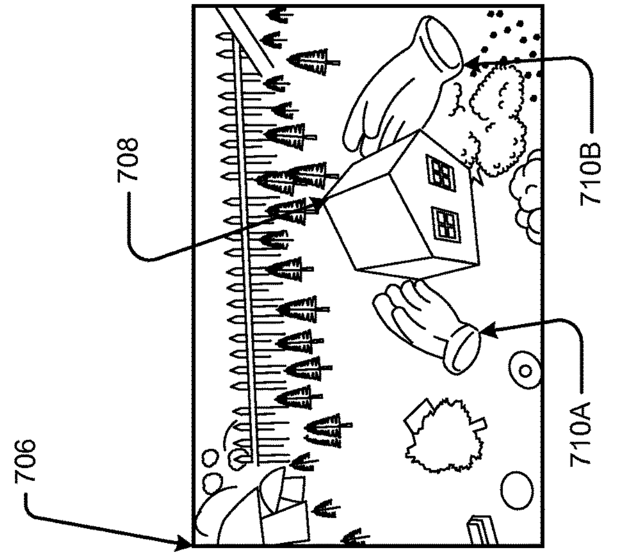
FIG. 7B is a schematic diagram showing an example of a corresponding virtual object rendered in a VR environment associated with a first VR application.
Figure 7A:
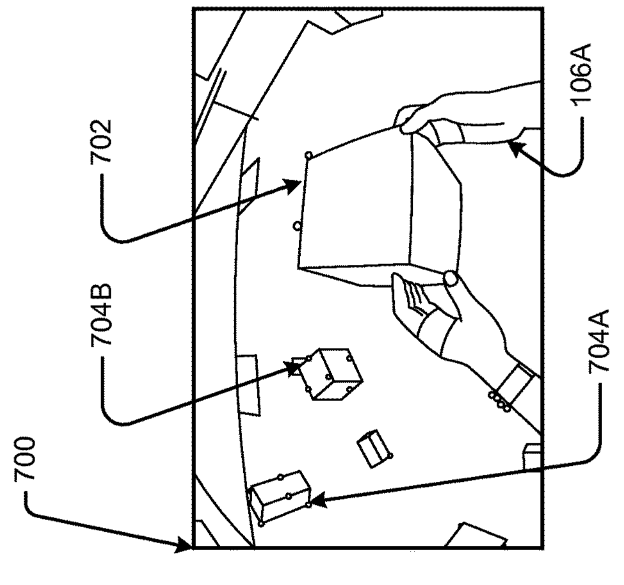
FIG. 7A is a schematic diagram showing an example of a real object in a real scene.

FIGS. 7A, 7B, 7C, 8A, 8B, and 8C are non-limiting examples of real scenes and/or VR environments. As described above, in at least one example, a virtual environment can be a virtual toy room, whose dimensions match a real room where a user (e.g., user 106A) is situated. The virtual toy room can be associated with a toy room VR application. One or more real blocks can be set around the real room. FIG. 7A is a schematic diagram 700 showing an example of a real object 702, such as a real block of the one or more real blocks, in a real scene. As illustrated in FIG. 7A, various other real objects 704A, 704B, etc., can also be physically present in the real scene. In FIG. 7A, a user 106 is interacting with the real object 702.

In the virtual toy room, there can be one or more virtual blocks in same positions as the one or more real blocks in the real room. The virtual blocks can represent proxies of real blocks. That is, the virtual blocks can represent virtual objects that correspond to the real blocks. FIG. 7B is a schematic diagram 706 showing an example of a corresponding virtual object 708 rendered in a VR environment associated with a first VR application. In the above referenced example, the first VR application can be the toy room VR application that is generating a virtual village VR environment. In at least one example, the corresponding virtual object 708 can represent a virtual block of the one or more virtual blocks described above. In at least one example, the virtual object 708 is associated with a first graphical element (e.g., a house) determined based at least in part on the first VR application. As illustrated in FIG. 7B, virtual objects 710A and 710B correspond to the position of the user's (e.g., user 106A) hands in FIG. 7A. In additional and/or alternative examples, a user (e.g., user 106A) can be represented by an avatar whose position can be calculated using inverse kinematics. The user (e.g., user 106A) can interact with the real object 702 such to cause changes to the graphical element associated with the virtual object 708 and/or trigger functionalities associated with the virtual object 708.

FIG. 7B depicts virtual content that is rendered in a VR display. Accordingly, the area surrounding the virtual object 708 that corresponds to the real object 702 can be made of virtual content determined by the VR application. In a MR environment, at least some of the area surrounding the virtual object 708 can be virtual content representative of the real scene and/or the real scene.

FIG. 7C is a schematic diagram 712 showing an example of the corresponding virtual object 708 rendered in the VR environment associated with the first VR application (e.g., the toy box VR application). The virtual object 708 can be associated with a second graphical element (e.g., a pair of binoculars) determined based at least in part on the first VR application. In FIG. 7C, the graphical element corresponding to the virtual object 708 can change from a graphical element representing a house, as illustrated in FIG. 7B, to a graphical element representing a pair of binoculars. In at least one example, the graphical element associated with virtual object 708 can change based at least in part on an interaction with the real object 702, as described above. The pair of binoculars can be associated with one or more functionalities that are different from the functionalities associated with the house. The one or more functionalities can be triggered based at least in part on interactions with the real object 702.

Figures 8A, 8B, 8C:
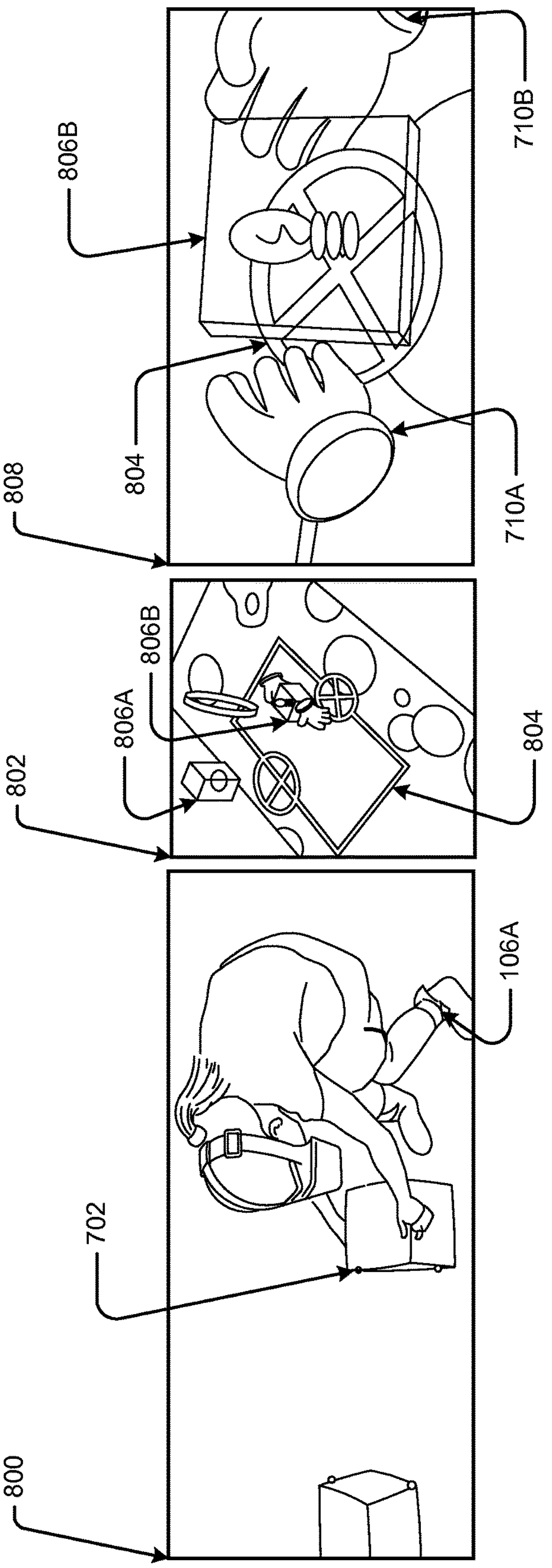
FIG. 8A is a schematic diagram showing an example of the real object in the real scene.
FIG. 8B is a schematic diagram showing an example of a VR environment that is associated with a second VR application.
FIG. 8C is a schematic diagram showing an example of a corresponding virtual object rendered in the VR environment that is associated with the second VR application.

FIG. 8A is a schematic diagram 800 showing an example of the real object 702 in a real scene. For illustrative purposes, the real object 702 is the same real object as illustrated in FIG. 7A and a same real scene. However, the real object 702 need not be same real object and/or the same real scene. As illustrated in FIG. 8A, the user (e.g., user 106A) is interacting with the real object 702. In an example described above, a circuit building VR application can render a virtual diagram of an electric circuit on a VR display. FIG. 8B is a schematic diagram 802 showing an example of a VR environment that is associated with a second VR application (e.g., a circuit building VR application). A center of the VR environment can include a virtual diagram 804 of an electric circuit with missing components. Several of the virtual blocks 806A, 806B, etc. can appear as transparent cubes with the missing components floating within. As illustrated in FIG. 8B, the user (e.g., user 106A) can be interacting with a virtual object 806B that represents the real object 702. Virtual object 806B can include a lightbulb and one of the missing components can be a lightbulb.

FIG. 8C is a schematic diagram 808 showing an example of a corresponding virtual object 806B rendered in a VR environment, where the virtual object 806B is associated with a graphical element determined based at least in part on the second VR application (e.g., the circuit building VR application). In at least one example, a user (e.g., user 106A) can learn about the basics of electricity and/or the conventions of electrical circuit diagrams and the user (e.g., user 106A) can interact with the real object 702 such to move the corresponding virtual object 806B to a location that corresponds to a missing component in the virtual diagram 804 of the electric circuit. Each component can be attached to a target behavior, which raises a matched boolean flag when the virtual object touches its target. Based at least in part on determining that the virtual block associated with the lightbulb (e.g., virtual object 806B) enters within a threshold distance of a target identified in the virtual electrical circuit diagram, the target behavior can be effectuated in the VR environment. As the correct components are put in place in the virtual circuit, the virtual circuit closes and begins to work. For instance, a virtual light bulb can illuminate, a virtual engine can start running, etc.

A. A system comprising: a sensor; one or more processors; memory; and one or more modules stored in the memory and executable by the one or more processors to perform operations comprising: receiving first data from the sensor; identifying, based at least in part on the first data, a real object that is physically present in a real scene, wherein the real object is associated with a unique identifier; accessing a virtual element that corresponds to the unique identifier, the virtual element representing at least one of a geometry or surface details of the real object; accessing a graphical element that corresponds to the unique identifier, the graphical element being determined based at least in part on a virtual reality application; causing a virtual object that corresponds to the virtual element and the graphical element to be rendered in a virtual reality scene; receiving second data from the sensor; determining, based at least in part on the second data, that the real object is interacted with via an interaction; determining a functionality associated with the graphical element and the interaction; and causing the functionality to be performed in the virtual reality scene.

B. A system as paragraph A recites, wherein the graphical element is different for different virtual reality applications.

C. A system as paragraph A or B recite, wherein the functionality is different for different virtual reality applications.

D. A system as any of paragraphs A-C recite, wherein causing the functionality to be performed comprises replacing the graphical element with a new graphical element based at least in part on the interaction.

E. A system as any of paragraphs A-D recite, wherein the interaction comprises shaking the real object.

F. A system as any of paragraphs A-E recite, wherein the interaction comprises rotating the real object.

G. A system as any of paragraphs A-F recite, wherein the interaction comprises tapping the real object.

H. A system as any of paragraphs A-G recite, wherein the interaction comprises stacking the real object on top of or on bottom of one or more other real objects.

I. A system as any of paragraphs A-H recite, wherein the interaction comprises placing the real object on a floor of the real scene.

J. A system as any of paragraphs A-I recite, wherein the interaction comprises moving the real object within a threshold distance of a predetermined position on a body of a user.

K. A system as any of paragraphs A-J recites, wherein: the sensor is associated with the real object; receiving the first data from the sensor comprises receiving position data and orientation data indicating a position and an orientation, respectively, of the real object from the sensor associated with the real object; and identifying the real object based at least in part on the position data and the orientation data.

L. A system as any of paragraphs A-K recite, wherein: the sensor is integrated into at least one of a device associated with a user or an external device associated with the real scene; the operations further comprise determining position data and orientation data indicating a position and an orientation, respectively, of the real object based at least in part on the first data received from the sensor; and identifying the real object based at least in part on the position data and the orientation data.

M. A computer-implemented method, the method comprising: receiving first data from a sensor; accessing, based at least in part on the first data received from the sensor, a position and an orientation of a first real object that is physically present in a real scene; identifying the first real object based at least in part on the position and the orientation of the first real object; causing a first graphical element corresponding to the first real object to be rendered on a display of a virtual reality display device, the first graphical element being determined based at least in part on a first virtual reality application; receiving second data from the sensor; determining, based at least in part on the second data, a first interaction with the first real object; and causing a first functionality associated with the first graphical element to be performed.

N. A computer-implemented method as paragraph M recites, wherein the first functionality comprises causing a second graphical element to be rendered on the display instead of the first graphical element, the second graphical element being determined based at least in part on the first virtual reality application and being different from the first graphical element.

O. A computer-implemented method as either paragraph M or N recites, further comprising determining the first functionality based at least in part on the first interaction.

P. A computer-implemented method as paragraph O recites, further comprising: receiving third data from the sensor; determining, based at least in part on the third data, a second interaction with the first real object; determining, based at least in part on the second interaction, a second functionality associated with the first graphical element; and causing a performance of the second functionality associated with the first graphical element.

Q. A computer-implemented method as of paragraphs M-P recite, further comprising: determining that the first virtual reality application is terminated; determining that a second virtual reality application is activated; and causing a second graphical element corresponding to the first real object to be rendered on the display of the virtual reality display device, the second graphical element being determined based at least in part on a second virtual reality application and being different from the first graphical element.

R. A computer-implemented method as any of paragraphs M-Q recite, further comprising: determining, based at least in part on the first data received from the sensor, a position and an orientation of a second real object that is physically present in the real scene; identifying the second real object based at least in part on the position and the orientation of the second real object; causing a second graphical element corresponding to the second real object to be rendered on the display of the virtual reality display device, the second graphical element being determined based at least in part on the first virtual reality application; determining that the second real object is placed within a threshold distance of the first real object in a stacked configuration or an aligned configuration; and replacing the first graphical element and the second graphical element with a third graphical element corresponding to the first real object and the second real object.

S. One or more computer-readable media encoded with instructions that, when executed by a processor, configure a computer to perform a method as any of paragraphs M-R recite.

T. A device comprising one or more processors and one or more computer readable media encoded with instructions that, when executed by the one or more processors, configure a computer to perform a computer-implemented method as any of paragraphs M-R recite.

U. A computer-implemented method, the method comprising: means for receiving first data from a sensor; means for accessing, based at least in part on the first data received from the sensor, a position and an orientation of a first real object that is physically present in a real scene; means for identifying the first real object based at least in part on the position and the orientation of the first real object; means for causing a first graphical element corresponding to the first real object to be rendered on a display of a virtual reality display device, the first graphical element being determined based at least in part on a first virtual reality application; means for receiving second data from the sensor; determining, based at least in part on the second data, a first interaction with the first real object; and causing a first functionality associated with the first graphical element to be performed.

V. A computer-implemented method as paragraph U recites, wherein the first functionality comprises causing a second graphical element to be rendered on the display instead of the first graphical element, the second graphical element being determined based at least in part on the first virtual reality application and being different from the first graphical element.

W. A computer-implemented method as either paragraph U or V recites, further comprising means for determining the first functionality based at least in part on the first interaction.

X. A computer-implemented method as paragraph W recites, further comprising: means for receiving third data from the sensor; means for determining, based at least in part on the third data, a second interaction with the first real object; means for determining, based at least in part on the second interaction, a second functionality associated with the first graphical element; and means for causing a performance of the second functionality associated with the first graphical element.

Y. A computer-implemented method as of paragraphs U-X recite, further comprising: means for determining that the first virtual reality application is terminated; means for determining that a second virtual reality application is activated; and means for causing a second graphical element corresponding to the first real object to be rendered on the display of the virtual reality display device, the second graphical element being determined based at least in part on a second virtual reality application and being different from the first graphical element.

Z. A computer-implemented method as any of paragraphs U-Y recite, further comprising: means for determining, based at least in part on the first data received from the sensor, a position and an orientation of a second real object that is physically present in the real scene; means for identifying the second real object based at least in part on the position and the orientation of the second real object; means for causing a second graphical element corresponding to the second real object to be rendered on the display of the virtual reality display device, the second graphical element being determined based at least in part on the first virtual reality application; means for determining that the second real object is placed within a threshold distance of the first real object in a stacked configuration or an aligned configuration; and replacing the first graphical element and the second graphical element with a third graphical element corresponding to the first real object and the second real object.

AA. One or more computer storage media having computer-executable instructions that, when executed by one or more processors, configure the one or more processors to perform operations comprising: receiving first data from a sensor; identifying a real object that is physically located in a real environment based at least in part on the data; rendering a virtual object that corresponds to the real object in a virtual reality environment, the virtual object being associated with: a virtual element that represents the real object; a graphical element corresponding to the virtual element, the graphical element changing based at least in part on different virtual reality applications; and one or more functionalities, the one or more functionalities changing based at least in part on at least one of the different virtual reality applications or different interactions with the real object; receiving second data from the sensor; determining, based at least in part on the second data, an interaction with the real object; and causing, based at least in part on the interaction, a performance of the one or more functionalities in at least one of a mixed reality environment or a virtual reality environment.

AB. One or more computer storage media as paragraph AA recites, wherein, prior to rendering the virtual object that corresponds to the real object in the virtual reality environment, the operations further comprise: determining, based at least in part on the first data, a geometry of the real object; assigning a unique identifier to the real object; generating the virtual element that maps to the geometry of the real object; assigning the unique identifier to the virtual element; performing semantic recognition on the real object to determine an identity of the real object; based at least in part on results of the semantic recognition, associating one or more graphical elements with the unique identifier; based at least in part on identifying the real object, determining the unique identifier corresponding to the real object; and accessing the virtual element and the one or more graphical elements.

CONCLUSION

Although the present disclosure can use language that is specific to structural features and/or methodological acts, the invention is not limited to the specific features or acts described herein. Rather, the specific features and acts are disclosed as illustrative forms of implementing the invention A, submitted herewith, is expressly incorporated herein by reference in its entirety.

As described above, while the disclosure describes VR environments, many of the techniques described herein can also be used for MR environments using MR devices instead of VR devices.

We claim:

1. A system comprising:
a sensor;
one or more processors;
memory; and
one or more modules stored in the memory and executable by the one or more processors to perform operations comprising:
receiving first data from the sensor;
identifying, based at least in part on the first data, a first real object and a second real object that are physically present in a real scene;
determining a position of the first real object and a position of the second real object in the real scene;
accessing a first virtual element and a second virtual element representing at least one of a geometry or surface details of the first real object and the second real object;
causing a first virtual object and a second virtual object, corresponding to the first virtual element and the second virtual element respectively, to be rendered in a virtual reality scene based on a virtual reality application;

receiving second data from the sensor;

detecting, based on the second data, an interaction where the second real object is placed within a threshold distance of the first real object in the real scene; and causing, in response to the interaction, presentation of a third virtual object to be rendered on the virtual reality scene to replace the first virtual object and the second virtual object.

2. A system as claim 1 recites, wherein the first virtual element is different for different virtual reality applications.

3. A system as claim 1 recites, further comprising:

receiving third data from the sensor;

detecting, based on the third data, a second interaction with that the first real object;

determining a functionality associated with the first virtual object and the interaction; and causing the functionality to be performed in the virtual reality scene, wherein the functionality is different for different virtual reality applications.

4. A system as claim 3 recites, wherein causing the functionality to be performed comprises replacing the first virtual object with a new virtual object based at least in part on the interaction.

5. A system as claim 3 recites, wherein the interaction comprises shaking the first real object.

6. A system as claim 3 recites, wherein the interaction comprises rotating the first real object.

7. A system as claim 3 recites, wherein the interaction comprises tapping the first real object.

8. A system as claim 3 recites, wherein the interaction comprises stacking the first real object on top of or on bottom of one or more other real objects.

9. A system as claim 3 recites, wherein the interaction comprises placing the first real object on a floor of the real scene.

10. A system as claim 3 recites, wherein the interaction comprises moving the first real object within a threshold distance of a predetermined position on a body of a user.

11. A system as claim 1 recites, wherein receiving the first data from the sensor further comprises:

receiving position data and orientation data for the first real object and the second real object.

12. A system as claim 1 recites, wherein the sensor is integrated into at least one of a device associated with a user or an external device associated with the real scene.

13. A system as claim 1 recites, wherein detecting the interaction further comprises:

detecting that the first real object and the second real object are stacked or aligned.

14. A computer-implemented method, the method comprising:

receiving first data from a sensor;

accessing, based at least in part on the first data received from the sensor, a position and an orientation of a first real object that is physically present in a real scene;

identifying the first real object based at least in part on the position and the orientation of the first real object;

causing a first graphical element corresponding to the first real object to be rendered on a display of a virtual reality display device, the first graphical element being determined based at least in part on a first virtual reality application;

receiving second data from the sensor;

determining, based at least in part on the second data, a first interaction with the first real object;

causing a first functionality associated with the first graphical element to be performed;

determining that the first virtual reality application is terminated;

determining that a second virtual reality application is activated; and causing a second graphical element corresponding to the first real object to be rendered on the display of the virtual reality display device, the second graphical element being determined based at least in part on a second virtual reality application and being different from the first graphical element.

15. A computer-implemented method as claim 14 recites, wherein the first functionality comprises causing a second graphical element to be rendered on the display instead of the first graphical element, the second graphical element being determined based at least in part on the first virtual reality application and being different from the first graphical element.

16. A computer-implemented method as claim 14 recites, further comprising determining the first functionality based at least in part on the first interaction.

17. A computer-implemented method as claim 16 recites, further comprising:

receiving third data from the sensor;

determining, based at least in part on the third data, a second interaction with the first real object;

determining, based at least in part on the second interaction, a second functionality associated with the first graphical element; and causing a performance of the second functionality associated with the first graphical element.

18. One or more computer storage media having computer-executable instructions that, when executed by one or more processors, configure the one or more processors to perform operations comprising:

receiving first data from a sensor;

identifying a real object that is physically located in a real environment based at least in part on the first data;

determining, based at least in part on the first data, a geometry of the real object;

assigning a unique identifier to the real object;

generating a virtual element that maps to the geometry of the real object;

assigning the unique identifier to the virtual element;

performing semantic recognition on the real object to determine an identity of the real object;

based at least in part on results of the semantic recognition, associating one or more graphical elements with the unique identifier;

based at least in part on identifying the real object, determining the unique identifier corresponding to the real object; and accessing the virtual element and the one or more graphical elements;

rendering a virtual object that corresponds to the real object in a virtual reality environment, the virtual object being associated with:

the virtual element that represents the real object;

a graphical element corresponding to the virtual element, the graphical element changing based at least in part on different virtual reality applications; and one or more functionalities, the one or more functionalities changing based at least in part on at least one of the different virtual reality applications or different interactions with the real object;

receiving second data from the sensor;

determining, based at least in part on the second data, an interaction with the real object; and causing, based at least in part on the interaction, a performance of the one or more functionalities in at least one of a mixed reality environment or a virtual reality environment.

* * * * *